United States Patent [19]

Christman

[11] 4,234,371
[45] Nov. 18, 1980

[54] METHOD AND APPARATUS FOR APPLYING A CIRCUMFERENTIAL TREAD TO A TIRE CARCASS

[75] Inventor: Harold E. Christman, Santa Cruz, Calif.

[73] Assignee: Brad Ragan, Incorporated, Spruce Pine, N.C.

[21] Appl. No.: 896,714

[22] Filed: Apr. 17, 1978

Related U.S. Application Data

[63] Continuation-in-part of Ser. No. 849,663, Nov. 8, 1977.

[51] Int. Cl.² ............................................. B29H 17/36
[52] U.S. Cl. .................................. 156/96; 152/209 R; 156/128 R; 156/73.6; 156/421; 156/582
[58] Field of Search ............. 156/96, 123 R, 126–130, 156/408–413, 421, 394, 486–490, 73.6, 582; 152/209

[56] References Cited

U.S. PATENT DOCUMENTS

| | | | |
|---|---|---|---|
| 3,152,942 | 10/1964 | Horton et al. ....................... | 156/408 |
| 3,283,795 | 11/1966 | Schelkmann .......................... | 156/96 |
| 3,411,975 | 11/1968 | Rowe ................................... | 156/96 |
| 3,477,891 | 11/1969 | Hawerkamp ......................... | 156/582 |
| 3,515,618 | 6/1970 | Sidles ................................... | 156/421 |
| 3,736,199 | 5/1973 | Mason ................................... | 156/582 |
| 3,925,126 | 12/1975 | Leatherman et al. ................ | 156/73.6 |
| 3,954,538 | 5/1976 | Grawey ................................ | 156/408 |
| 4,052,246 | 10/1977 | Albareda .............................. | 156/421 |

*Primary Examiner*—John E. Kittle
*Attorney, Agent, or Firm*—Bell, Seltzer, Park & Gibson

[57] ABSTRACT

An elongate elastomeric tread strip having a contoured tread face of at least two ribs and an intervening valley is applied to a peripheral tread supporting surface of a pneumatic tire carcass by laying the flat back of one end portion of at least one such strip against and generally tangent to the tread supporting surface of the carcass, and rotating the carcass to wrap the tread strip therearound while stitching the strip to the carcass by pressingly engaging the contoured face of the tread strip with a contoured roller defining a moving contoured surface whose contour at least substantially matches that of the tread strip. The method and apparatus also provide for subjecting the tread strip to a rapidly vibrating force to aid further in causing the strip to uniformly contact the tire carcass throughout the width of the tread strip being applied to the carcass.

2 Claims, 4 Drawing Figures

METHOD AND APPARATUS FOR APPLYING A CIRCUMFERENTIAL TREAD TO A TIRE CARCASS

This application is a continuation-in-part of copending application Ser. No. 849,663, filed Nov. 8, 1977, and entitled METHOD AND APPARATUS FOR MAKING FLOTATION TIRE AND TIRE PRODUCT.

Methods and apparatus for building new pneumatic tires and for retreading or renewing previously used tire carcasses have long been known in the tire industry. As is well known to persons skilled in the applicable arts, both the building of new tire carcasses and the retreading or renewing of previously used tire carcasses includes the application of peripheral layers of circumferentially extending elastomeric material such as rubber. Such materials have been known as tread, undertread strip, "camel back" and by other names known to persons skilled in the applicable arts.

Heretofore, it has been conventional practice in the construction of new tires and the retreading or renewing of previously used tire carcasses to "stitch" such materials to a tire carcass. The term "stitch" is a term of art within the tire industry and refers to the expulsion of air otherwise entrapped between a layer of elastomeric material and another surface, usually an underlying surface of a tire carcass. Stitching frequently is accomplished by the use of rollers, ranging in size from relatively small hand-held and operated stitching rollers to quite large rollers employed with quite large sizes of tires or in the manufacture of new tire carcasses.

In any tire building, retreading or renewing operation involving stitching, difficulty is encountered from time to time with assuring that all air otherwise trapped between layers of rubber of elastomeric material is expelled. The care which must be exercised in stitching frequently presents problems for even skilled operators, substantially increasing the labor requirements for production of quality tires. As will be understood, such difficulties additionally slow the performance of the necessary steps in the manufacture, retreading or renewing of tire carcasses. These difficulties have been particularly apparent in circumstances where elongate strips applied to the carcass are of contoured or irregular cross-sectional configuration, such as by being formed in alternate peaks and valleys.

With the aforementioned difficulties in mind, it is an object of the present invention to facilitate stitching of elastomeric material to a pneumatic tire carcass. In realizing this object of the present invention, material being applied to a peripheral, circumferential surface of a tire carcass is engaged in a manner such as to assure that air otherwise possibly trapped is properly expelled.

Another object of this invention is the subjection of an elastomeric strip being applied to a tire carcass to a rapidly vibrating force generally perpendicular to the carcass surface to which the strip is being applied. Such a rapidly vibrating stitching force aids in causing the strip to uniformly contact the carcass throughout its entire width while expelling air from beneath the strip, all in accordance with the present invention.

Yet a further object of this invention is to provide, in apparatus for applying elastomeric strips to a tire carcass, a tread strip engaging means which has a continuous contoured surface thereon adapted to pressingly engage a contoured face of a strip in substantially matching relation thereto. By matching contours of the contoured strip and the strip engaging means for stitching rollers, a more uniform application of force is accomplished.

BRIEF DESCRIPTION OF THE DRAWINGS

Some of the objects and advantages of the invention having been stated, other objects and advantages will appear as the description proceeds when taken in connection with the accompanying drawings, in which.

DETAILED DESCRIPTION

Figure 1:
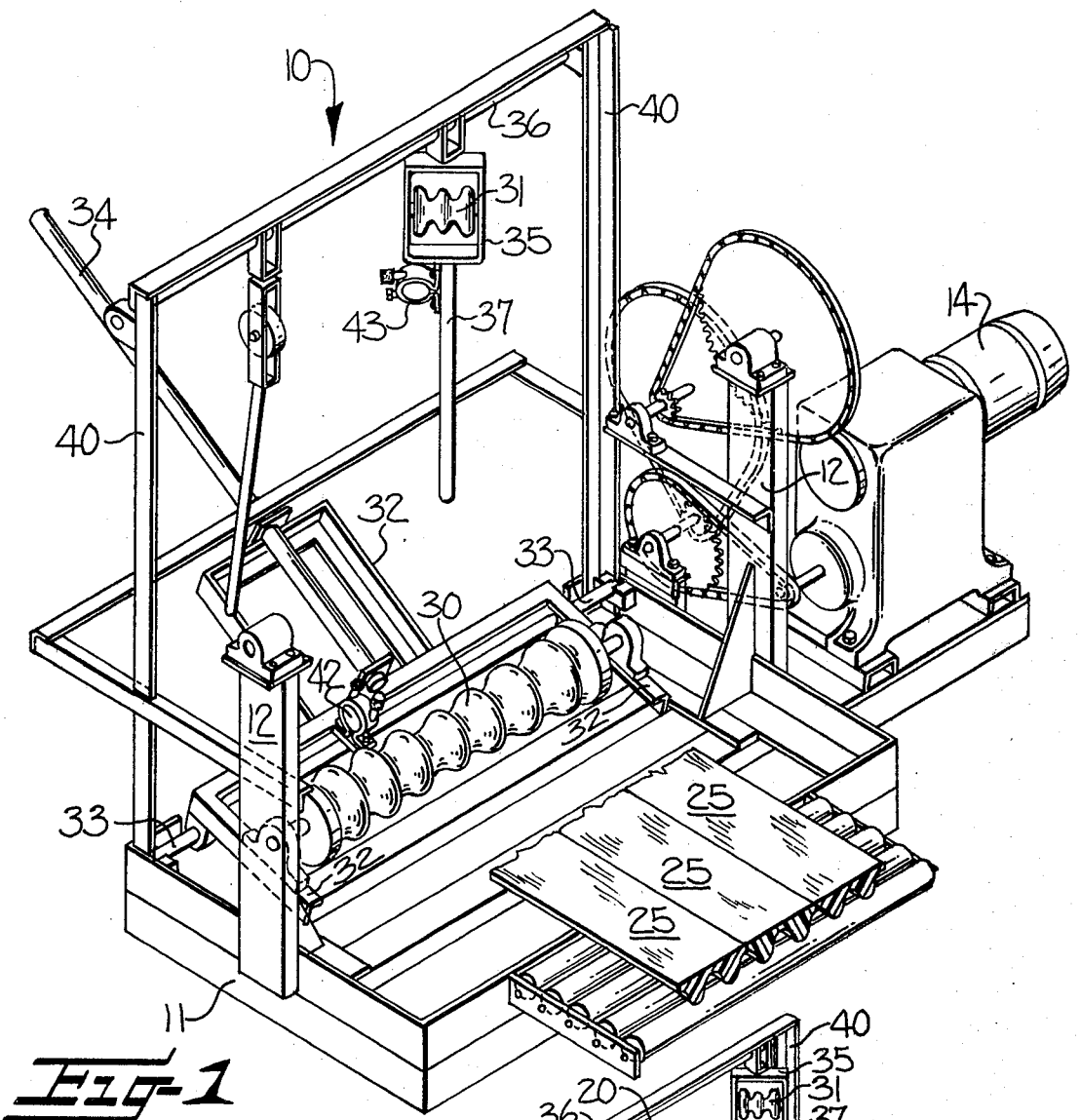
FIG. 1 is a perspective view of a tire supporting frame apparatus for applying a peripheral circumferential or hoop tread to the carcass of a pneumatic flotation tire in accordance with the method of this invention.

As indicated earlier herein, the apparatus and method of this invention are concerned with the application of a peripheral layer of a circumferentially extending elastomeric material to a pneumatic tire carcass. In the accompanying drawings there is shown a tire supporting frame apparatus, generally designated at 10, which may be of substantially the type disclosed in copending application, Ser. No. 849,633, and which is designed to facilitate the building of pneumatic flotation tires in accordance with the method claimed in said copending application. The tire carcass C shown in the environment for the present invention disclosure is in the form of a flotation tire carcass having a relatively wide outer peripheral tread surface supporting C-1 to which a circumferential tread is to be applied in accordance with this invention. It is to be understood that, although the present invention is primarily concerned with the application of a circumferential tread to a carcass of a flotation tire, the principles of the present invention are contemplated as being equally applicable for applying material to any type of pneumatic tire carcass.

Referring more specifically to the drawings, the tire supporting frame apparatus 10 comprises a substantially rectangular base frame 11 having a pair of upstanding intermediate posts 12 thereon on which a mounting axle means 13 is rotatably supported for being driven by a suitable motive means 14 during the application of material to the tire carcass C. The mounting axle means 13 may be of any desired construction, such as that disclosed in said copending application, for supporting the tire casing C thereon for rotation therewith.

Figure 2:
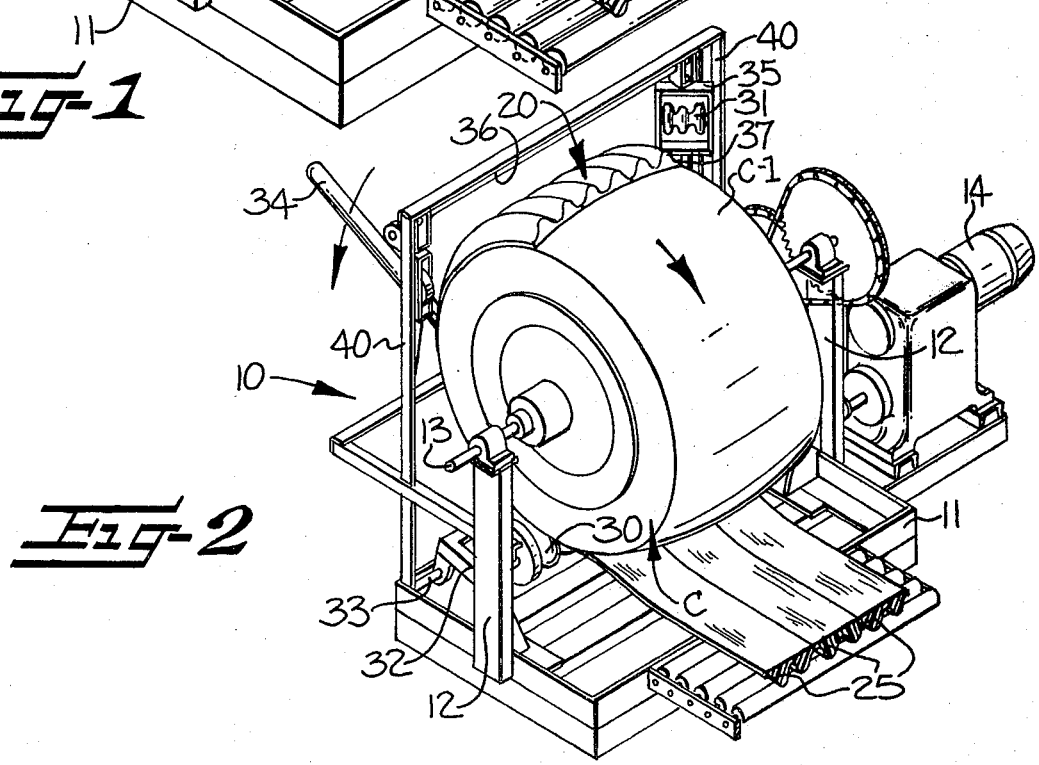
FIG. 2 is a view similar to FIG. 1, but being on a reduced scale, and showing a circumferential tread being applied to a flotation tire carcass mounted in the tire supporting frame apparatus.
Figure 3:
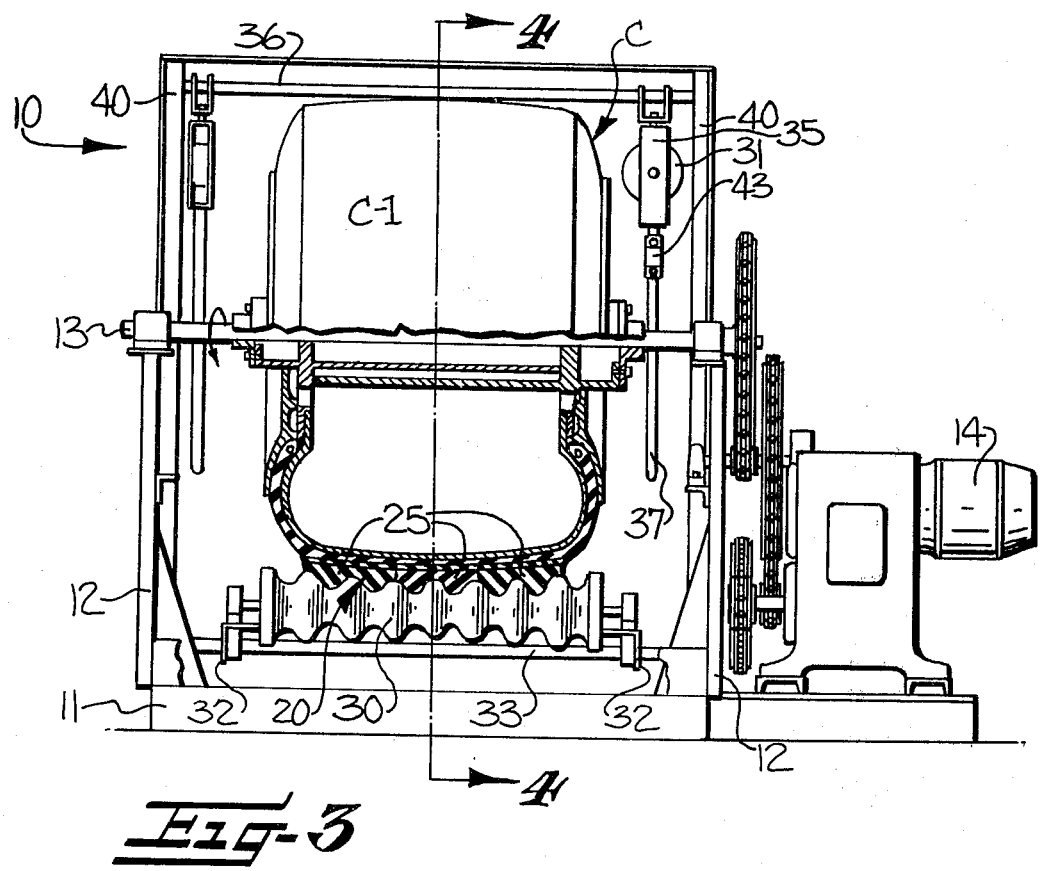
FIG. 3 is an enlarged front end elevation of the apparatus as viewed in FIG. 2, with the lower portions of the tire carcass, mounting axle means and the tread shown in cross-section, and also omitting a roller type feed conveyor which is shown in the right-hand lower portions of FIGS. 1 and 2.
Figure 4:
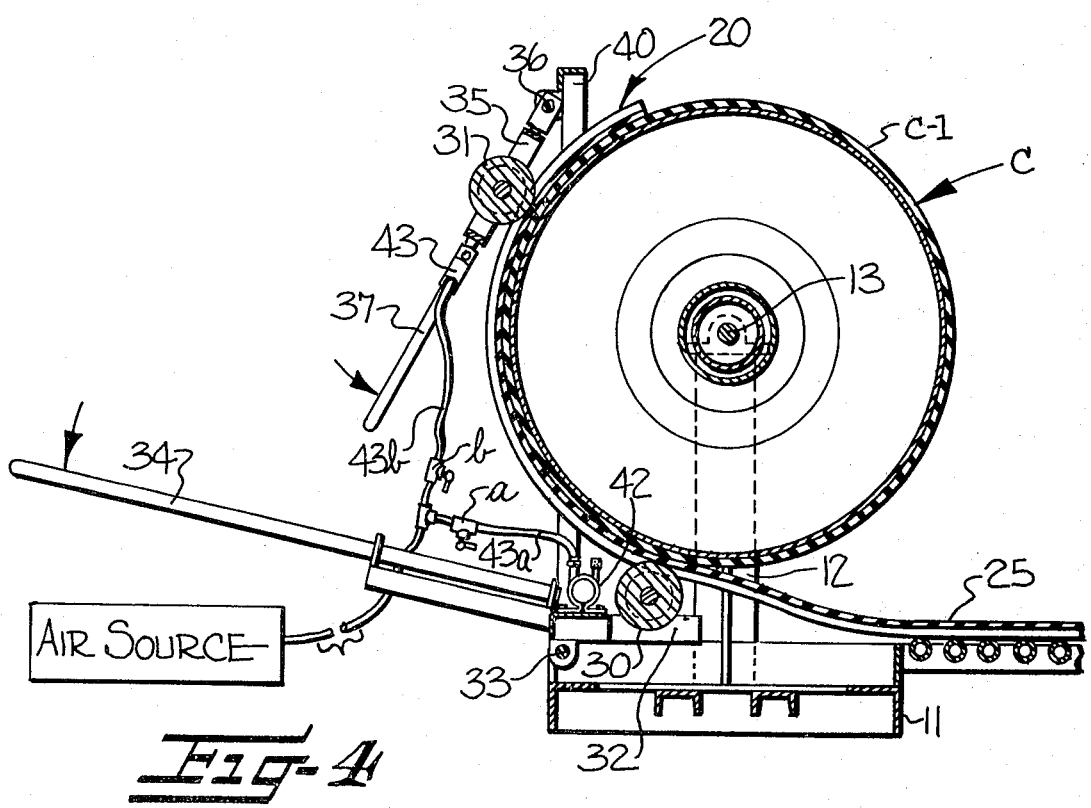
FIG. 4 is a vertical sectional view taken substantially along line 4—4 in FIG. 3.

In order to apply a peripheral circumferential or hoop tread 20 to the tread supporting surface C-1 of the tire carcass C in accordance with this invention, tread strip material is prepared and applied as generally indicated in the accompanying drawings. In the form illustrated, the tread material of natural or synthetic rubber takes the form of an elongate elastomeric tread strip, or a plurality of such tread strips, each of which is indicated at 25, and each of which has a contoured tread face in the shape of a pair of projecting longitudinally extending ribs, an intervening valley therebetween, and wings extending laterally from the distal portions of the pair of projecting ribs. Each tread strip 25 has a substantially flat back opposite from the contoured tread face. As particularly illustrated, three such strips 25 are positioned in side-by-side abutting relationship for encircling the tread supporting surface C-1 of the tire carcass C, it being noted that the tread strips 25 are shown only partially installed on the tire carcass C in FIGS. 2, 3 and 4.

To apply the peripheral circumferential tread 20 to the carcass C of the pneumatic tire according to the method of this invention, the flat back surface of one end portion of each of the tread strips 25 is directed to extend generally tangent to and is laid against the peripheral outer surface C-1 of the carcass C, and the carcass is rotated about its axis to wrap the tread strip or strips 25 therearound while the contoured tread face of each strip is pressingly engaged with a moving continuous contoured surface whose contour at least substantially matches that of the tread strip or strips 25 to cause the same to uniformly contact the carcass C and to press out air from between the carcass C and the strips 25. As a further adjunct to the method, the tread face of each tread strip 25 is subjected to a rapidly vibrating force to aid in causing the strip to uniformly contact the carcass throughout the entire width of the tread strip or strips. Such an operation of bringing two surfaces into a bonding engagement and pressing out air is known to persons skilled in rubber manufacturing as "stitching".

The improved apparatus for carrying out the method as described comprises a first or lower contoured stitching roller means 30 and a second or upper contoured stitching roller means 31 which are adapted to pressingly engage the contoured tread faces of the tread strips 25 during rotation of the carcass C about its axis. As preferred, the lower contoured stitching roller means 30 is so contoured and of such axial length as to simultaneously engage all the tread strips 25 involved in the application of the peripheral circumferential tread 20 to the tire carcass C, but the upper contoured stitching roller means 31 differs from the lower contoured stitching roller means 30 in that it is of a relatively short axial length and is adapted to pressingly engage only one of the tread strips 25, or adjacent portions of two adjacent tread strips 25, at a time. Each of the contoured stitching roller means 30, 31 defines a moving continuous contoured surface which is a solid of revolution and whose contour at least substantially matches that of the tread strips being engaged thereby so as to cause the tread strips to uniformly contact the carcass C.

As preferred, the circumferential ribs formed by the faces of the tread strips 25 are curvilinear in cross-sectional configuration, having convex semicircular or "crowned" portions and reversed concave semicircular valleys intervening between the projecting ribs and of substantially the same width. Accordingly, it is also preferred that the contoured surfaces of the roller means 30, 31 are of a substantially matching configuration to that of the projecting ribs and valleys of the tread strip or strips to be engaged thereby.

The lower contoured stitching roller means 30 is rotatably mounted on the front portion of a built-up frame or frame lever 32 fulcrumed or pivotally mounted on a transverse shaft 33 and having an elongate arm 34 extending rearwardly therefrom and to which a downward force may be applied manually or otherwise for transmitting an upward force to the lower contoured stitching roller means 30 generally toward the axis of the tire carcass C on the mounting axle means 13.

It should be noted that the upper contoured stitching roller means 31 is relatively short as compared to the lower contoured stitching roller means 30 so that it may be of relatively light weight for hand manipulation by an operator. Accordingly, the upper contoured stitching roller means 31 is rotatably mounted in a relatively small frame lever 35 having one end portion thereof pivotally and slidably supported on a transverse substantially horizontally disposed pivot shaft 36, and having an elongate arm or handle 37 extending outwardly from the other end thereof. It will be noted that the transverse shaft 33 serving as the fulcrum for the lower frame lever 32 is suitably supported by the substantially rectangular base frame 11, and the upper transverse shaft 36 is suitably supported on a pair of rear upright frame members or posts 40 whose lower portions are suitably secured to the base frame 11.

It is thus apparent that, by sliding the frame lever 35 along the shaft 36, an operator may selectively position the relatively short upper contoured stitching roller means 31 in alignment with any of the contoured tread strips 25, and a downward force may be applied to the arm 37 of the frame lever 35, either manually or by any suitable means, to cause the upper contoured stitching roller means 31 to pressingly engage the contoured tread face of the corresponding strip 25 to aid in causing the same to uniformly contact the tread supporting surface C-1 of the carcass C during rotation thereof about its axis.

Means are provided for imparting vibration, at a relatively high frequency, to each of the contoured stitching roller means 30, 31 during application of the peripheral circumferential tread to the tire carcass C to aid further in uniformly contacting the back of each tread strip with the carcass so as to further insure that there will be no air trapped between the proximal surfaces of each tread strip and the tire carcass. Accordingly, vibrating means 42, 43 are mounted on the respective frame levers 32, 35 and are preferably positioned closely adjacent the respective stitching roller means 30, 31 for transmitting vibration through the frame levers to the corresponding roller means. In this instance, the vibrating means 42, 43 are shown as being of the pneumatic type, having respective air lines 43a, 43b (FIG. 4) leading therefrom to a suitable source of compressed air.

It is preferred that manually operable control valves a, b are interposed in the respective air lines 43a, 43b. It is apparent that the frequency of the vibration imparted to each of the stitching roller means 30, 31 is not critical. By way of example, in the actual use of the apparatus of this invention, the output of each vibrating means 42, 43 was approximately 5,500 vibrations per minute. Also, the pneumatically operated vibrating means are shown by way of illustration only, since it is apparent that electrically operated or other fluid operated vibrating means may be employed without departing from the invention.

In the operation of the apparatus, after a tire casing C has been mounted in the tire supporting frame apparatus 10 in the manner indicated herein, it is apparent that the leading ends of the desired number of tread strips 25 may be positioned upon and in substantially mating relationship with the lower contoured stitching roller means 30, with the tread strips 25 in side-by-side abutting relationship. Thereupon, with the vibrating means 42, 43 in operation, rotation may be imparted to the tire carcass C in a clockwise direction in FIGS. 2 and 4 while downward force is being applied to the arm 34 of the frame lever 32 to lay the corresponding end portions of the backs of the tread strips 25 against and in substantially tangential relation to the tread supporting surface C-1 of the carcass C and to cause the contoured stitching roller means 30 to pressingly engage the contoured tread faces of the strips 25 and stitch the strips to the tread supporting surface C-1 of the carcass C as the tread strips 25 are being wrapped around the rotating carcass. Upon the leading end portions of the tread strips 25 reaching the vicinity of the second or upper contoured stitching roller means 31, it is apparent that the operator may selectively position such roller means 31 in engagement with the contoured tread faces of the strips 25 passing therebeneath while applying pressure thereto to effectively contact the flat back of each contoured tread strip, throughout the width thereof, with the tread supporting surface C-1 of the corresponding tire carcass C.

Following application of the encircling tread strips 25 to the tire carcass C, the tire may be positioned in a suitable pressure vessel, not shown, for curing and bonding together the tread strips and the carcass. Persons familiar with the applicable arts of tire manufacture will be aware of variations which may be employed in these steps of the method in accordance with the present invention and relating to application of uncured or cured tread strips to an uncured or previously cured tire carcass construction. While it is deemed preferable, in the present invention, to apply uncured tread strips to a previously cured tire carcass, it is to be appreciated that other approaches may be deemed to be acceptable alternatives by others practicing the present invention.

In the drawings and specification there has been set forth a preferred embodiment of the invention, and although specific terms are employed, they are used in a generic and descriptive sense only and not for purposes of limitation.

That which is claimed is:

1. A method for applying a peripheral circumferential tread to the carcass of a pneumatic tire, said method comprising:

providing an elongate elastomeric tread strip having a substantially flat back and a contoured tread face with at least two longitudinally extending ribs and an intervening valley on the opposite side thereof, laying the flat back of one end portion of at least one such tread strip against and generally tangent to the peripheral outer surface of the carcass, and rotating the carcass about its axis to wrap the tread strip therearound, while pressingly engaging the contoured tread face of the strip with a rotating, rapidly vibrating, continuous contoured surface having a contour which is a solid of revolution and which at least substantially matches the at least two longitudinally extending ribs and intervening valley of the tread strip as by having longitudinally spaced apart rib engaging portions and an intervening, enlarged diameter valley engaging portion to cause the same to uniformly contact the carcass throughout the width of the tread strip.

2. Apparatus for applying to a tire carcass a circumferential tread formed from at least one elongate elastomeric tread strip having a substantially flat back on one side thereof and a contoured tread face with at least two longitudinally extending ribs and an intervening valley on the opposite side thereof, said apparatus comprising:

means for supporting a carcass for rotation about its axis, rotatable tread strip engaging means having a continuous surface thereon having longitudinally spaced apart rib engaging portions and an intervening, enlarged diameter valley engaging portion adapted to pressingly engage the at least two longitudinally extending ribs and intervening valley of a contoured tread face of a tread strip, mounting means for said engaging means and being adapted to so position the engaging means relative to said carcass supporting means as to guide the tread strip with its back laying against and extending substantially tangent to the periphery of the carcass to aid in uniformly contacting the carcass with the back of the tread strip as the carcass is being rotated to stitch the tread strip therearound, and means operatively associated with said tread strip engaging means for imparting vibration thereto to aid in uniformly stitching the tread strip to the carcass during rotation thereof.

* * * * *